(12) United States Patent
Baxter et al.

(10) Patent No.: US 8,013,570 B2
(45) Date of Patent: Sep. 6, 2011

(54) ELECTRICAL CIRCUIT SHARING FOR ELECTRIC VEHICLE CHARGING STATIONS

(75) Inventors: David Baxter, Monte Sereno, CA (US); Carl F. Hagenmaier, Jr., Los Altos, CA (US); Milton T. Tormey, Los Altos, CA (US); Richard Lowenthal, Cupertino, CA (US)

(73) Assignee: Coulomb Technologies, Inc., Campbell, CA (US)

( * ) Notice: Subject to any disclaimer, the term of this patent is extended or adjusted under 35 U.S.C. 154(b) by 0 days.

(21) Appl. No.: 12/508,488

(22) Filed: Jul. 23, 2009

(65) Prior Publication Data

US 2010/0134067 A1   Jun. 3, 2010

(51) Int. Cl.
*H02J 7/00* (2006.01)
*H02J 7/04* (2006.01)
*H02J 7/16* (2006.01)

(52) U.S. Cl. ........ 320/109; 320/101; 320/108; 320/107; 320/104

(58) Field of Classification Search .................. 320/109, 320/101, 107, 108, 106; 361/64; 705/412; 324/434; 340/995.27; 141/94
See application file for complete search history.

(56) References Cited

U.S. PATENT DOCUMENTS

| | | | | |
|---|---|---|---|---|
| 5,327,066 A | * | 7/1994 | Smith | 320/109 |
| 5,594,318 A | * | 1/1997 | Nor et al. | 320/108 |
| 5,656,916 A | * | 8/1997 | Hotta | 320/160 |
| 5,982,596 A | | 11/1999 | Spencer et al. | |
| 6,067,008 A | * | 5/2000 | Smith | 340/438 |
| 6,087,805 A | * | 7/2000 | Langston et al. | 320/109 |
| 6,225,776 B1 | * | 5/2001 | Chai | 320/109 |
| 6,614,204 B2 | * | 9/2003 | Pellegrino et al. | 320/109 |
| 2005/0099131 A1 | | 5/2005 | Amarillas et al. | |
| 2009/0021213 A1 | * | 1/2009 | Johnson | 320/109 |
| 2009/0261779 A1 | * | 10/2009 | Zyren | 320/109 |
| 2010/0017249 A1 | * | 1/2010 | Fincham et al. | 705/8 |
| 2010/0026237 A1 | * | 2/2010 | Ichikawa et al. | 320/109 |
| 2010/0039062 A1 | * | 2/2010 | Gu et al. | 320/101 |

* cited by examiner

*Primary Examiner* — Edward Tso
*Assistant Examiner* — Alexis Boateng
(74) *Attorney, Agent, or Firm* — Blakely, Sokoloff, Taylor & Zafman LLP

(57) ABSTRACT

Electric vehicle charging stations are coupled with a circuit sharing controller. Multiple electric vehicle charging stations are wired on the same electrical circuit. The circuit sharing controller implements a circuit sharing process that dynamically allocates electric current to charging stations on the same electrical circuit such that the capacity of the electrical circuit is not exceeded while permitting each of those charging stations to draw electric current through that electrical circuit for at least some amount of time.

8 Claims, 11 Drawing Sheets

ELECTRICAL CIRCUIT SHARING FOR ELECTRIC VEHICLE CHARGING STATIONS

BACKGROUND

1. Field

Embodiments of the invention relate to the field of electric vehicle charging stations, and more specifically to electrical circuit sharing for electric vehicle charging stations.

2. Background

Charging stations are typically used to provide charging points for electric vehicles (e.g., electric battery powered vehicles, gasoline/electric battery powered vehicle hybrid, etc.). Charging stations may be located in designated charging locations (e.g., similar to locations of gas stations), parking spaces (e.g., public parking spaces and/or private parking space), etc. Most electric plug-in vehicles have on board chargers that accept either 110V, 220V (230V in Europe) and draw power at current levels from 11 A to 70 A.

Electrical service (wiring and circuit protection) of the appropriate rating is typically brought to each of the charging stations. Multiple charging stations can be on the same electrical circuit, which is connected to an electrical breaker panel that is fed by a service drop from a local utility distribution transformer.

In a typical charging station installation, the size of the wiring, the breaker, and the service drop associated with a circuit is determined by simply summing the current ratings of each of the charging stations on the circuit (thus, a maximum use scenario is assumed). In this way, it can be assured that if all of the charging stations are in use at the same time, and all are delivering their maximum current, the breaker will not trip and the wiring will not overheat.

BRIEF DESCRIPTION OF THE DRAWINGS

The invention may best be understood by referring to the following description and accompanying drawings that are used to illustrate embodiments of the invention. In the drawings.

DETAILED DESCRIPTION

Figure 1:
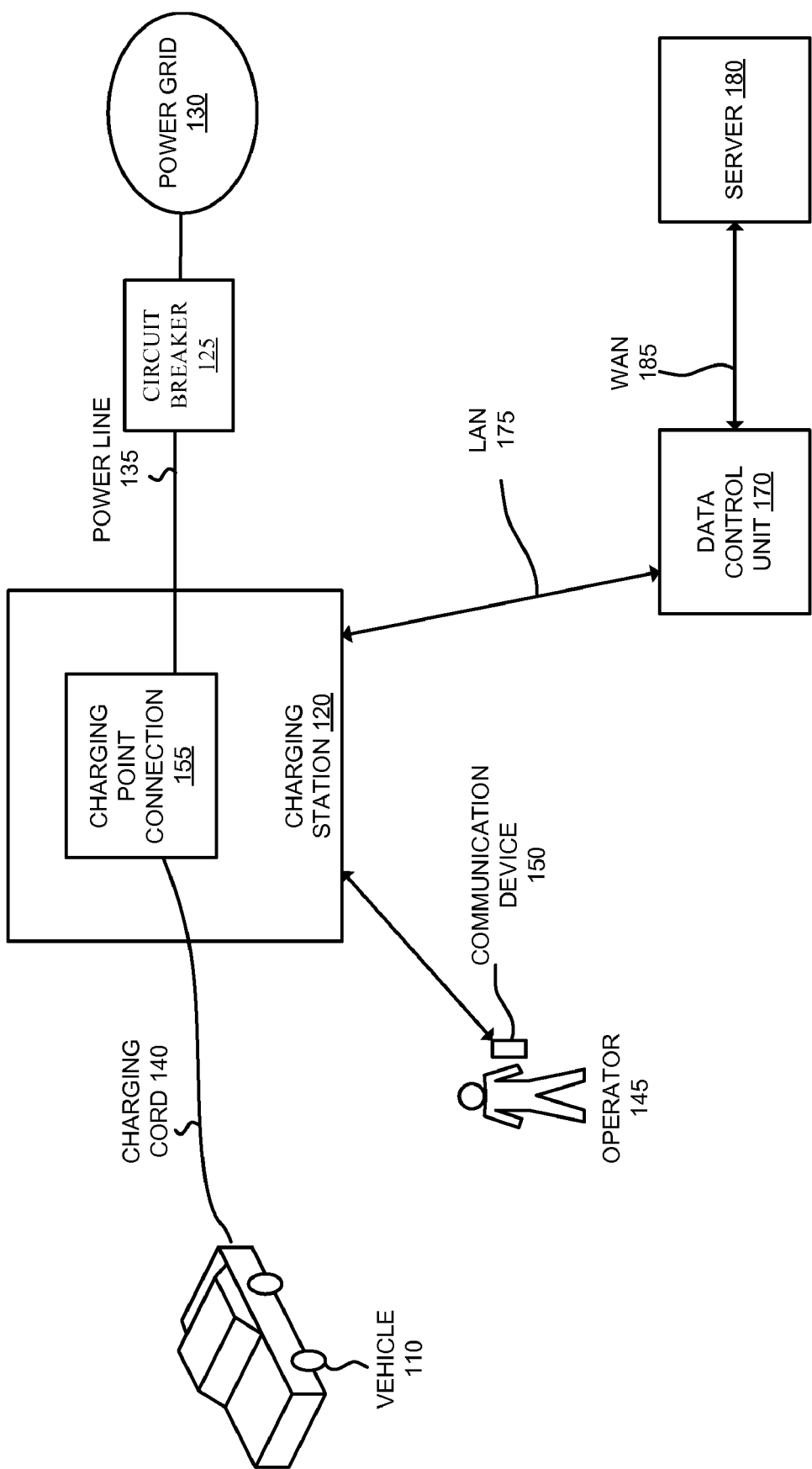
FIG. 1 illustrates an exemplary charging system according to one embodiment of the invention.

In the following description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

The techniques shown in the figures can be implemented using code and data stored and executed on one or more computing devices (e.g., electric vehicle charging stations, electric vehicle charging station network servers, circuit sharing controllers, etc.). As used herein, a charging station is a piece of equipment, including hardware and software, to charge electric vehicles. Such computing devices store and communicate (internally and with other computing devices over a network) code and data using machine-readable media, such as machine storage media (e.g., magnetic disks; optical disks; random access memory; read only memory; flash memory devices; phase-change memory) and machine communication media (e.g., electrical, optical, acoustical or other form of propagated signals—such as carrier waves, infrared signals, digital signals, etc.). In addition, such computing devices typically include a set of one or more processors coupled to one or more other components, such as a storage device, one or more input/output devices (e.g., a keyboard, a touchscreen, and/or a display), and a network connection. The coupling of the set of processors and other components is typically through one or more busses and bridges (also termed as bus controllers). The storage device and signals carrying the network traffic respectively represent one or more machine storage media and machine communication media.

Thus, the storage device of a given computing device typically stores code and/or data for execution on the set of one or more processors of that device. Of course, one or more parts of an embodiment of the invention may be implemented using different combinations of software, firmware, and/or hardware.

Electric vehicle charging stations (hereinafter "charging stations") are coupled with an electric vehicle charging station network server (hereinafter "server"). Multiple charging stations are wired to the same electrical circuit such that if each charging station were operating at full load the capacity of the electrical circuit would be exceeded. A dynamic circuit sharing process is performed to prevent the capacity of the electrical circuit from being exceeded while permitting the charging stations that share that electrical circuit to draw electric current through that electrical circuit for at least some amount of time. In one embodiment the circuit sharing process is controlled by a circuit sharing controller coupled with the charging stations.

The present invention will now be described in detail with reference to the drawings, which are provided as illustrative examples of the invention so as to enable those skilled in the art to practice the invention. Notably, the figures and examples below are not meant to limit the scope of the present invention to a single embodiment, but other embodiments are possible by way of interchange of some or all of the described or illustrated elements.

FIG. 1 illustrates an exemplary charging system according to one embodiment of the invention. The charging system illustrated in FIG. 1 includes the charging station 120, which is coupled with the power grid 130 over the power line 135. The power grid 130 can be owned and/or operated by local utility companies or owned and/or operated by private persons/companies. The power line 135 is wired to the circuit breaker 125, which can be separate and remote from the charging station 120. In one embodiment, the circuit breaker 125 is inaccessible to vehicle operators (e.g., the vehicle operator 145). As will be described in greater detail with reference to FIG. 3, in some embodiments additional charging stations besides the charging station 120 are wired on the same power line 135 to the circuit breaker 125 (i.e., multiple charging stations share the same electrical circuit).

Operators of electric vehicles (e.g., the electric vehicle operator 145) can use the charging station 120 to charge their electric vehicles (e.g., the electric vehicle 110). For example, the electricity storage devices (e.g., batteries, supercapacitors, etc.) of electric vehicles (e.g., electric powered vehicles, gasoline/electric powered vehicle hybrids, etc.) may be charged through use of the charging station 120. It should be understood that electric vehicle operators may include drivers of electric vehicles, passengers of electric vehicles, and/or service personnel of electric vehicles. In one embodiment, the operators of electric vehicles provide their own charging cord to charge their electric vehicle (e.g., the charging cord 140 belongs to the electric vehicle operator 145), while in other embodiments the charging station 120 includes an attached charging cord (e.g., the charging cord 140 is fixably attached to the charging station 120).

In one embodiment, the charging station 120 can charge in a dual mode at different voltages (e.g., 120V and 240V). By way of example, a fixably attached charging cord is typically used in a higher voltage mode (e.g., 240V) and an unattached charging cord is typically inserted into a power receptacle of the charging station 120 in a lower voltage mode (e.g., 120V).

In some embodiments, the flow of electrical power can be in either direction on the power line 135. In other words, the electric vehicle 110 can be charged from the power grid 130 or the power grid 130 can receive power from the electric vehicle 110 (hereinafter referred to as "vehicle-to-grid" (V2G). V2G is particularly attractive for electric vehicles that have their own charging devices, such as battery electric vehicles with regenerative braking and plug-in hybrid vehicles. Thus, in some embodiments of the invention, the electric vehicle 110 may consume electricity from the power grid 130 as well as transfer electricity to the power grid 130.

The charging station 120 is also coupled with the server 180 through the data control unit (DCU) 170. The DCU 170 acts as a gateway to the server 180 and relays messages and data between the charging station 120 and the server 180. The charging station 120 exchanges messages and data with the DCU 170 over the LAN (Local Area Network) link 175 (e.g., WPAN (Wireless Personal Area Network) (e.g., Bluetooth, ZigBee, etc.), or other LAN links (e.g., Ethernet, PLC (Power Line Communication), WiFi, etc.). The DCU 170 exchanges messages and data with the server 180 over the WAN link 185 (e.g., Cellular (e.g., CDMA, GPRS, etc.) WiFi Internet connection, Plain Old Telephone Service, leased line, etc.). According to one embodiment of the invention, the DCU 170 can be included as part of a charging station (e.g., the charging station 120 or a different charging station coupled with the server 180). In other embodiments the DCU 170 is be a separate device not part of a charging station. In some embodiments, the charging station 120 is coupled with the server 180 directly (i.e., without a connection through a DCU).

The server 180 provides services for multiple charging stations (e.g., authorization service, accounting services, etc.). As will be described in greater detail later herein, in one embodiment the server 180 controls and manages the electric current allocation for multiple charging stations through one or more messages sent to those charging stations (e.g., a message can indicate whether a charging station is permitted to allow electric current to flow on the power line 135). In other embodiments the DCU 170 can control and manage the electric current allocation of charging stations.

The server 180 stores vehicle operator information (e.g., operator account information, operator contact information (e.g., operator name, street address, email address, telephone number, etc.)) and charging station configuration information. The charging station configuration information can include information related to each charging station and the charging sessions on the charging stations. For example, for each charging station, the server 180 can store the following: the wiring group the charging station belongs to (as used herein, a wiring group corresponds to the physical wiring connection to a common circuit breaker), the electrical circuit capacity of the wiring group (e.g., the breaker size), a trip margin used to prevent false circuit breaker trips, a quantity of electric current that is currently being consumed or transferred, whether a vehicle is plugged into the charging station, the length of charging sessions (current and past), etc.

In one embodiment of the invention, the server 180 includes a subscriber portal (available through the Internet) which allows subscribers (owners and operators of electric vehicles) to register for service (which may include providing information regarding their electric vehicles, providing payment information, providing contact information, etc.) and perform other functions (e.g., pay for charging sessions, determine availability of charging stations, check the charging status of their electric vehicle(s), etc.). In addition, the server 180 may include a host portal (available through the Internet) which allows owners or administrators of the charging station 120 (and other charging stations) to configure their charging stations and perform other functions (e.g., determine average usage of charging stations, etc.). The host portal may also be used to configure the circuit sharing process described herein. Charging stations may also be configured using other means in some embodiments of the invention (e.g., through Telnet, user interface, etc.).

The charging station 120 controls the application of electricity between the charging point connection 155 and the power grid 130 by energizing and de-energizing the charging point connection 155. In one embodiment, the server 180 instructs the charging station 120 when to energize the charging point connection 155 and can also instruct the charging station 120 to de-energize the charging point connection 155. In one embodiment, the charging point connection 155 is a power receptacle or circuitry for an attached charging cord (e.g., thus the charging station 120 can energize/de-energize the power receptacle or the circuit for an attached charging cord). The power receptacle can be any number of types of receptacles such as receptacles conforming to the NEMA (National Electrical Manufacturers Association) standards 5-15, 5-20, and 14-50 or other standards (e.g., BS 1363, CEE7, etc.) and may be operating at different voltages (e.g., 120V, 240V, 230V, etc.).

Electric vehicle operators can request charging sessions for their electric vehicles in different ways in different embodiments of the invention. As one example, the electric vehicle operator 145 can use the communication device 150 to initiate and request a charging session for the electric vehicle 110. The communication device 150 may be a WLAN or WPAN device (e.g., one or two-way radio-frequency identification (RFID) device, mobile computing device (e.g., laptops, palmtop, smartphone, multimedia mobile phone, cellular phone, etc.)), ZigBee device, etc. The communication device 150 communicates unique operator-specific information (e.g., operator identification information, etc.) to the charging station 120 (either directly or indirectly through the server 180). In some embodiments, electric vehicle operator 145 may use the communication device 150 to monitor the charging status of the electric vehicle 110. In one embodiment of the invention, the communication device 150 may be coupled with the electric vehicle 110.

As another example, the electric vehicle operator 145 may interact with a payment station coupled with the charging station 120, which may then send appropriate instructions to the charging station 120 regarding the charging of the vehicle 110 (e.g., instructions to energize the charging point connection 155). The payment station may function similarly to a payment station for a parking space. In addition, a payment station coupled with the charging station 120 may be used both for parking payment and charging payment. As yet another example, the electric vehicle operator 145 may use a user interface of the charging station 120 to request a charging session for the electric vehicle 110.

Figure 2:
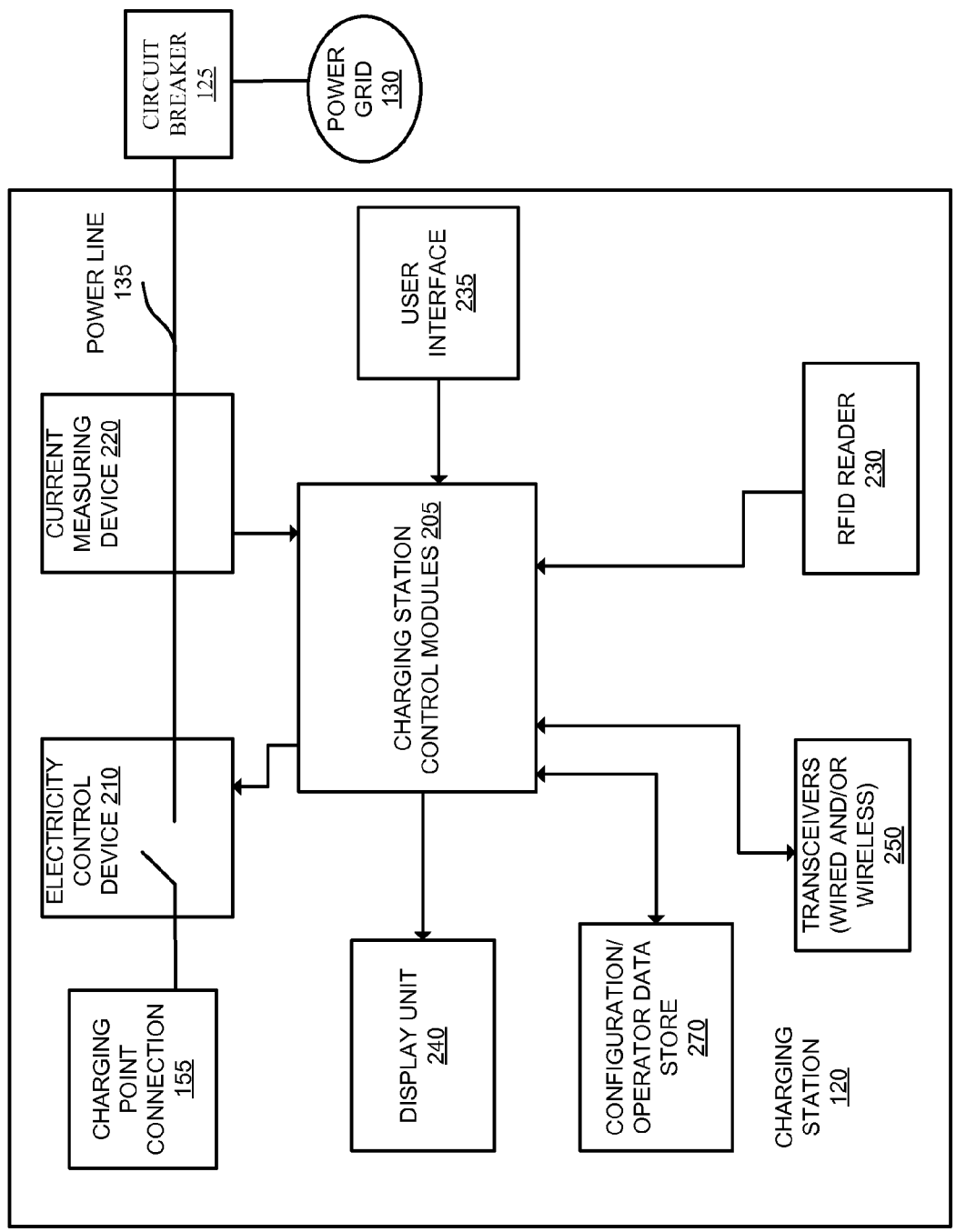
FIG. 2 illustrates an exemplary embodiment of the charging station illustrated in FIG. 1 according to one embodiment of the invention.

FIG. 2 illustrates an exemplary embodiment of the charging station 120 according to one embodiment of the invention. The charging station 120 includes the charging point connection 155, the charging station control modules 205, the electricity control device 210, the current measuring device 220, the RFID reader 230, the user interface 235, the display unit 240, and one or more transceivers 250 (e.g., wired transceiver(s) (e.g., Ethernet, power line communication (PLC), etc.) and/or wireless transceiver(s) (e.g., 802.15.4 (e.g., ZigBee, etc.), Bluetooth, WiFi, Infrared, GPRS/GSM, CDMA, etc.)). It should be understood that FIG. 2 illustrates an exemplary architecture of a charging station, and other, different architectures may be used in embodiments of the invention described herein. For example, some implementations of charging stations may not include a user interface, an RFID reader, or a connection to a network.

The RFID reader 230 reads RFID tags from RFID enabled devices (e.g., smartcards, key fobs, etc., embedded with RFID tag(s)) of operators that want to use the charging station 120. For example, the operator 145 may wave/swipe the mobile communication device 150 (if an RFID enabled device) near the RFID reader 230 to request a charging session from the charging station 120.

The RFID reader 230 passes the information read to one or more of the charging station control modules 205. The charging station control modules 205 are programmed to include instructions that establish charging sessions with the vehicles. In one embodiment, the operator 145 is authenticated and authorized based on the information the RFID reader 230 receives. While in one embodiment of the invention the charging station 120 locally stores authorization information (e.g., in the configuration/operator data store 270), in other embodiments of the invention one of the charging station control modules 205 transmits an authorization request to a remote device (e.g., the server 180) via one of the transceivers 250. For example, an authorization request is transmitted to the data control unit 170 over a WPAN transceiver (e.g., Bluetooth, ZigBee) or a LAN transceiver. The data control unit 170 relays the authorization request to the server 180.

In some embodiments, in addition to or in lieu of vehicle operators initiating charging sessions with RFID enabled devices, vehicle operators may use the user interface 235 to initiate charging sessions. For example, vehicle operators may enter in account and/or payment information through the user interface 235. For example, the user interface 235 may allow the operator 145 to enter in a username/password (or other information) and/or payment information. In other embodiments of the invention, vehicle operators may request charging sessions through devices remote to the charging station 120 (e.g., payment stations coupled with the charging stations). In some embodiments, the vehicle operators can also define a privilege or priority level of their request (e.g., charge immediately, charge anytime, etc.) which may affect the cost of that charging session.

One or more of the charging station control modules 205 cause the charging point connection 155 to be energized. For example, one or more of the charging station control modules 205 cause the electricity control device 210 to complete the connection of the power line 135 to the power grid 130. In one embodiment, the electricity control device 210 is a solid-state device that is controlled by the charging station control modules 205 or any other device suitable for controlling the flow of electricity. As will be described in greater detail later herein, in some embodiments the electricity control device 210 includes circuitry to variably control the amount of power draw (e.g. Pulse Width Modulation (PWM) circuitry). In some embodiments, the charging station control modules 205 cause the charging point connection 155 to be energized or de-energized based on messages received from the server 180 and/or from the DCU 170.

The current measuring device 220 measures the amount of current that is flowing on the power line 135 through the charging point connection 155 (e.g., between the vehicle 110 and the charging station 120). In some embodiments, in addition to electric vehicles being able to be charged from the power grid 130, these electric vehicles can be a source of electric power to be transferred to the power grid 130 (vehicle-to-grid (V2G)). While in one embodiment of the invention the current measuring device 220 measures flow of current, in an alternative embodiment of the invention the current measuring device 220 measures power draw. The current measuring device 220 may include or be coupled with an induction coil or other devices suitable for measuring current. The current measuring device 220 is coupled with the charging station control modules 205. The charging station control modules 205 are programmed with instructions to monitor the current data output from the current measuring device 220 and to calculate the amount of electricity being used over a given time period.

The display unit 240 is used to display messages to the operator 145 (e.g., charging status, confirmation messages, error messages, notification messages, etc.). The display unit 240 may also display parking information if the charging station 120 is also acting as a parking meter (e.g., amount of time remaining in minutes, parking violation, etc.). The configuration/operator data store 270 stores configuration information which may be set by administrators, owners, or manufacturers of the charging station 120.

While FIG. 1 illustrates a single charging station 120, it should be understood that many charging stations may be networked to the server 180 (through one or more data control units) and/or to each other. In addition, multiple charging stations can share the same circuit, be coupled with the same circuit breaker, and have their power draw controlled by the same circuit sharing controller in some embodiments.

Figure 3:
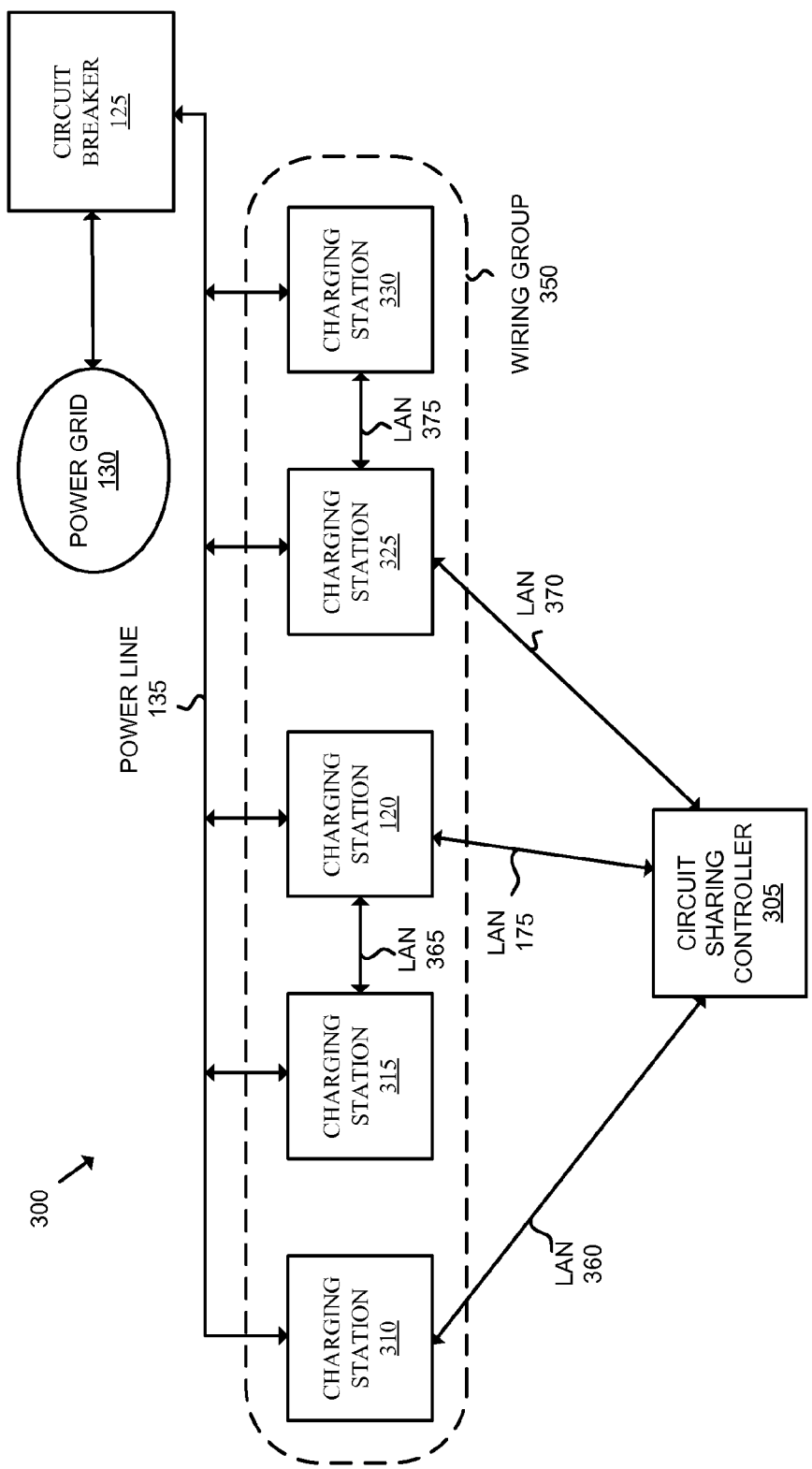
FIG. 3 illustrates an exemplary network of charging stations that are each wired to the same circuit breaker according to one embodiment of the invention.

FIG. 3 illustrates an exemplary network of charging stations that share the same electrical circuit and circuit breaker according to one embodiment of the invention. The charging station network 300 includes the charging stations 120, 310, 315, 325, and 330 coupled with circuit sharing controller 305. The charging stations 120, 310, 315, 325, and 330 are each wired to the circuit breaker 125 and share the same power line 135. Thus, the charging stations 120, 310, 315, 325, and 330 share the same electrical circuit. The charging stations 120, 310, 315, 325, and 330 are in the wiring group 350.

As will be described later herein, in one embodiment the circuit sharing controller 305 controls and manages the power draw of the charging stations in the wiring group 350 through one or more messages to those charging stations. The circuit sharing controller 305 can implemented on the server 180, the DCU 170, or a separate device coupled with the charging stations of the wiring group 350. The charging stations 120, 310, and 325 are directly coupled with the circuit sharing controller 305 via the LAN links 175, 360, and 370 respectively. The charging station 315 is indirectly coupled with the circuit sharing controller 305 through the LAN link 365 to the charging station 120 which is itself directly coupled with the circuit sharing controller 305 via the LAN link 175. The charging station 330 is indirectly coupled with the circuit sharing controller 305 through the LAN link 375 to the charging station 325 which is itself directly coupled with the circuit sharing controller 305 over the LAN link 370.

Although not illustrated in order not to confuse understanding of the invention, the charging stations 120, 310, 315, 325, and 330 are also part of the same radio group (as used herein, a radio group is a collection of one or more charging stations that collectively has a single connection to an electric vehicle charging station network server). It should be understood that the network architecture illustrated in FIG. 3 is exemplary and different embodiments can have different network architectures. For example, wiring groups can include members that are associated with different circuit sharing controllers and a single circuit sharing controller can manage charging stations in multiple wiring groups. As another example, each charging station can have a direct connection with the circuit sharing controller 305.

As illustrated in FIG. 3, each of the charging stations 120, 310, 315, 325, and 330 share the same circuit (they all receive power through the power line 135) and are all each coupled with the same circuit breaker 125. It should be understood that if activity at one of the charging stations 120, 310, 315, 325, and 330 causes the circuit breaker 125 to trip then all of the charging stations will lose their electrical connection with the power grid 130 (i.e., they all lose power). Thus, upon the circuit breaker 125 tripping, any charging sessions currently in progress on the charging stations 120, 310, 315, 325, and 330 will be interrupted.

As illustrated in FIG. 3, multiple charging stations (charging stations 120, 310, 315, 325, and 330) share the same electrical circuit and are wired to the same circuit breaker (circuit breaker 125). It should be understood that all of the charging stations in the wiring group 350 may not be delivering their maximum charging output at a given time. For example, some of the charging stations may be idle (not being used). As another example, charging stations may not supply their maximum charging output when an electric car has been fully charged or nearly charged. In order to reduce the cost to install power distribution infrastructure, the size of the circuit is chosen such that the circuit supports something less than a complete utilization of the charging stations (in terms of electric current draw) on the circuit. Thus, in one embodiment, the circuit will be overloaded and the circuit breaker 125 will trip if all of the charging stations in the wiring group 350 are each supplying current according to their maximum rating. In other words, the circuit will overload if there is a complete utilization of all the charging stations in the wiring group 350. Of course, it should be understood that the circuit can be overloaded by a smaller amount of utilization of the charging stations in the wiring group 350.

In order to prevent the electrical circuit from overloading and the circuit breaker 125 from tripping, the charging stations in the wiring group 350, in cooperation with the circuit sharing controller 305, dynamically manage their power delivery such that the total electric current draw on the electrical circuit does not exceed a capacity of the electrical circuit (or a smaller amount of the capacity to protect against spurious breaker trips) while allowing for multiple charging stations to be wired to the same physical electrical circuit.

As previously described, the circuit sharing controller 305 can instruct the charging stations to commence or cease drawing electric current for charging sessions. In some embodiments, the circuit sharing controller 305 limits the power draw of individual charging stations on the same electrical circuit such that the total power consumed by all of the charging stations on that electrical circuit does not exceed the capacity of the electrical circuit.

In one embodiment, the circuit sharing controller 305 dynamically allocates electric current to the charging stations in the wiring group 350 (at least those who are requesting electric current allocation) based on at least an amount of electric current presently allocated on the electrical circuit (e.g., the amount of electric current presently allocated to ones of the charging stations in the wiring group 350) in such a way to prevent the capacity of the electrical circuit from being exceeded while permitting each of those charging stations to draw electric current through the electrical circuit for at least some amount of time. The electric current allocation of the individual charging stations can be dynamically adjusted (either increased or decreased) based on a set of one or more factors (e.g., the number of charging stations requesting electric current allocation, the amount of electric current presently allocated on the electrical circuit, the capacity of the electrical circuit, the amount of electric current requested, and one or more charging session attributes (e.g., charging session duration, the type of account associated with the charging session (e.g., privilege of the account), percentage of charge complete, percentage of charge remaining, battery temperature of the electric vehicle, time remaining on the charging session, priority of the charging session, etc.)).

The allocation of electric current for charging stations on the same circuit can be performed differently in different embodiments of the invention. In one embodiment, the circuit sharing controller 305 controls the amount of electric current that each of the charging stations in the wiring group 350 can draw through a series of messages exchanged between those charging stations and the circuit sharing controller 305.

Figure 4:
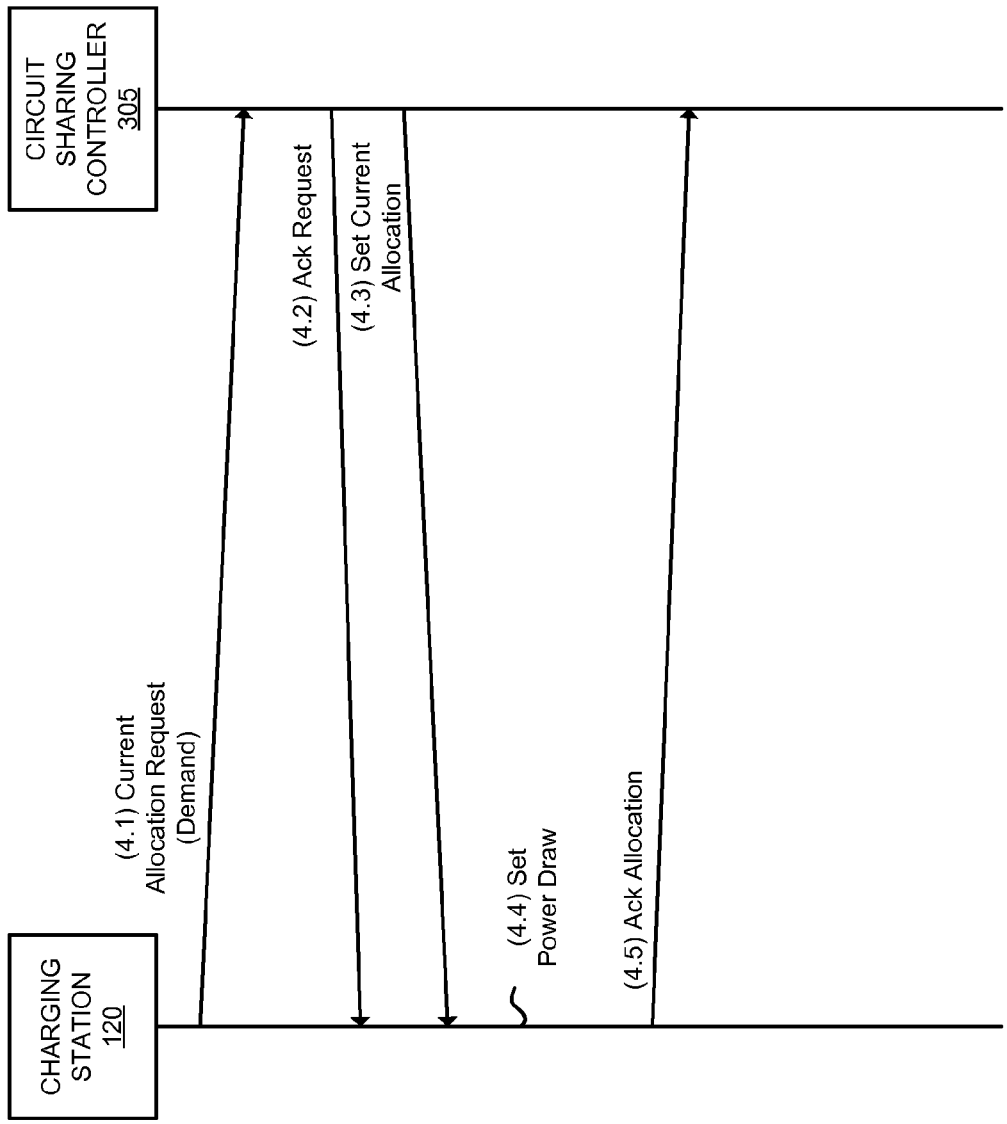
FIG. 4 illustrates an exemplary series of messages exchanged between a charging station and a circuit sharing controller during allocation of electric current according to one embodiment of the invention.

FIG. 4 illustrates an exemplary series of messages exchanged between the charging station 120 and the circuit sharing controller 305 during allocation of electric current for the charging station 120 according to one embodiment of the invention. FIG. 4 will be described with reference to FIG. 3, however it should be understood that the operations described with reference to FIG. 4 can be performed by embodiments of the invention other than those discussed with reference to FIG. 3.

At operation 4.1, the charging station 120 transmits an electric current allocation request message to the circuit sharing controller 305. In one embodiment, the electric current allocation request message includes an amount of current that the charging station 120 would like to draw from the power grid 130 (the power grid 130 is not shown in FIG. 4 in order not to obscure understanding of the invention). The amount of electric current requested can vary. For example, upon an initial charging session request, the amount of current can be the maximum amount of current rated for the charging point connection of the charging station. However, after charging has been complete (or substantially complete), the charging station may send an electric current allocation request for less than the maximum amount of current rated for the charging point connection. The charging stations transmit the electric current allocation requests when the amount of current changes (e.g., when an electric vehicle is plugged into the charging station, the electric vehicle has been completely or substantially completely charged), the charging station has timed-out waiting for an acknowledgement message from the circuit sharing controller 305, and when it powers on and/or undergoes a system restart.

At operation 4.2, the circuit sharing controller 305 transmits an acknowledgment message to the charging station 120 in response to receiving the electric current allocation request of operation 4.1. As described above, if the charging station 120 does not receive the acknowledgment message in response to the electric current allocation request within a timeout interval, it will resend the request message. In some embodiments the acknowledgement message transmitted in operation 4.2 is optional.

The circuit sharing controller 305 processes the electric current allocation request including determining whether to grant the request with the requested allocation of electric current (or at least a portion of the requested allocation of electric current). The circuit sharing controller 305 can determine whether to grant the request and what amount of electric current to allocate in different ways in different embodiments of the invention. In one embodiment, a load sharing process is used where multiple charging stations that are wired to the same electrical circuit can share the load of the circuit such that each of those charging stations are allocated an amount of electric current and the sum of the allocated electric current does not exceed the capacity of the circuit. An exemplary load sharing process will be described in greater detail with respect to FIGS. 5A-B and 6. In another embodiment, a time sharing process is used where multiple charging stations that are wired to the same electrical circuit take turns drawing power from the power grid (not necessarily equally) such that the capacity of the circuit is not exceeded. An exemplary time sharing process will be described in greater detail with respect to FIGS. 7-9.

Figure 5A:
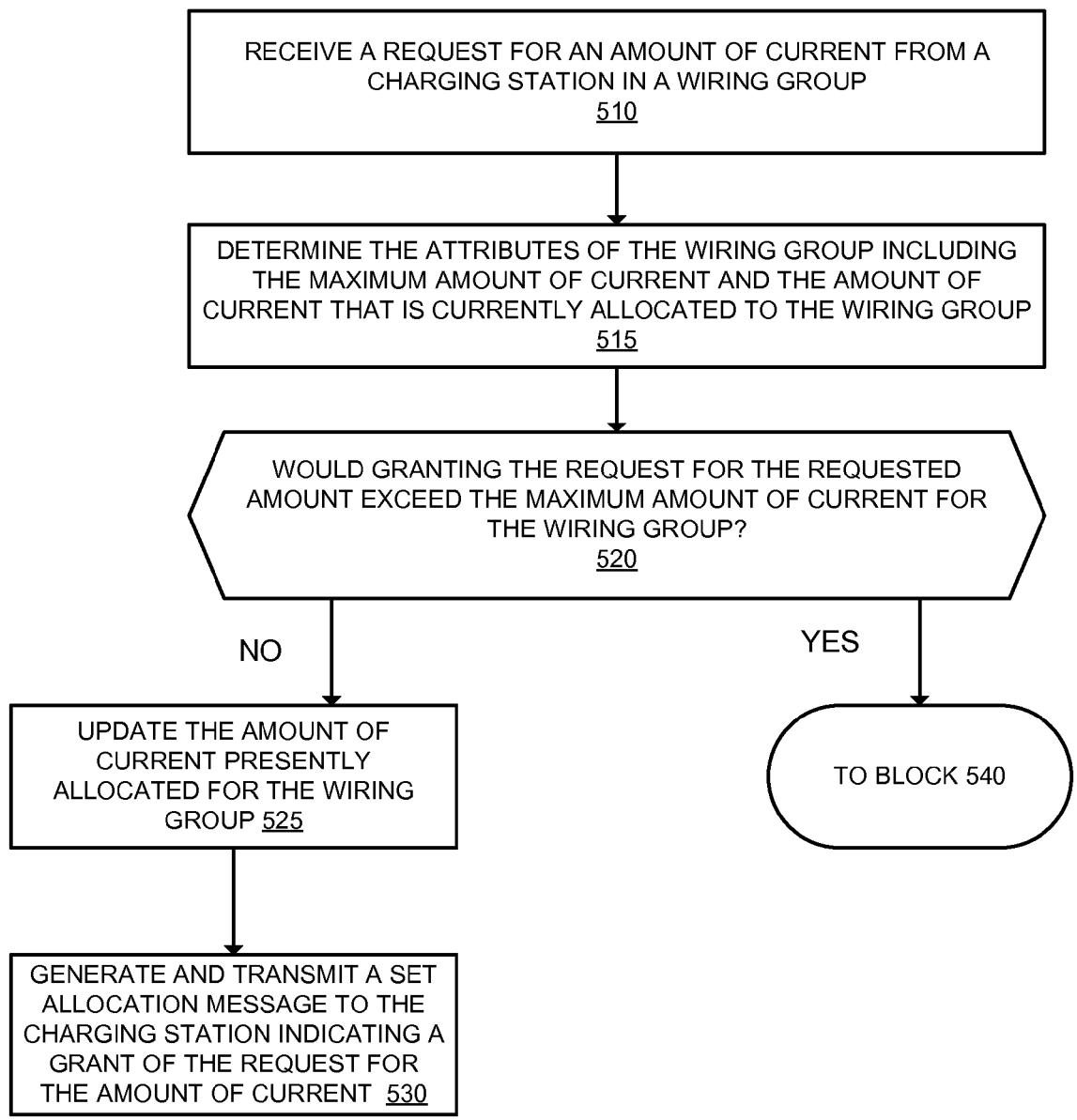
FIGS. 5A-B are flow diagrams illustrating exemplary operations for a circuit sharing process based on load sharing according to one embodiment of the invention.
Figure 5B:
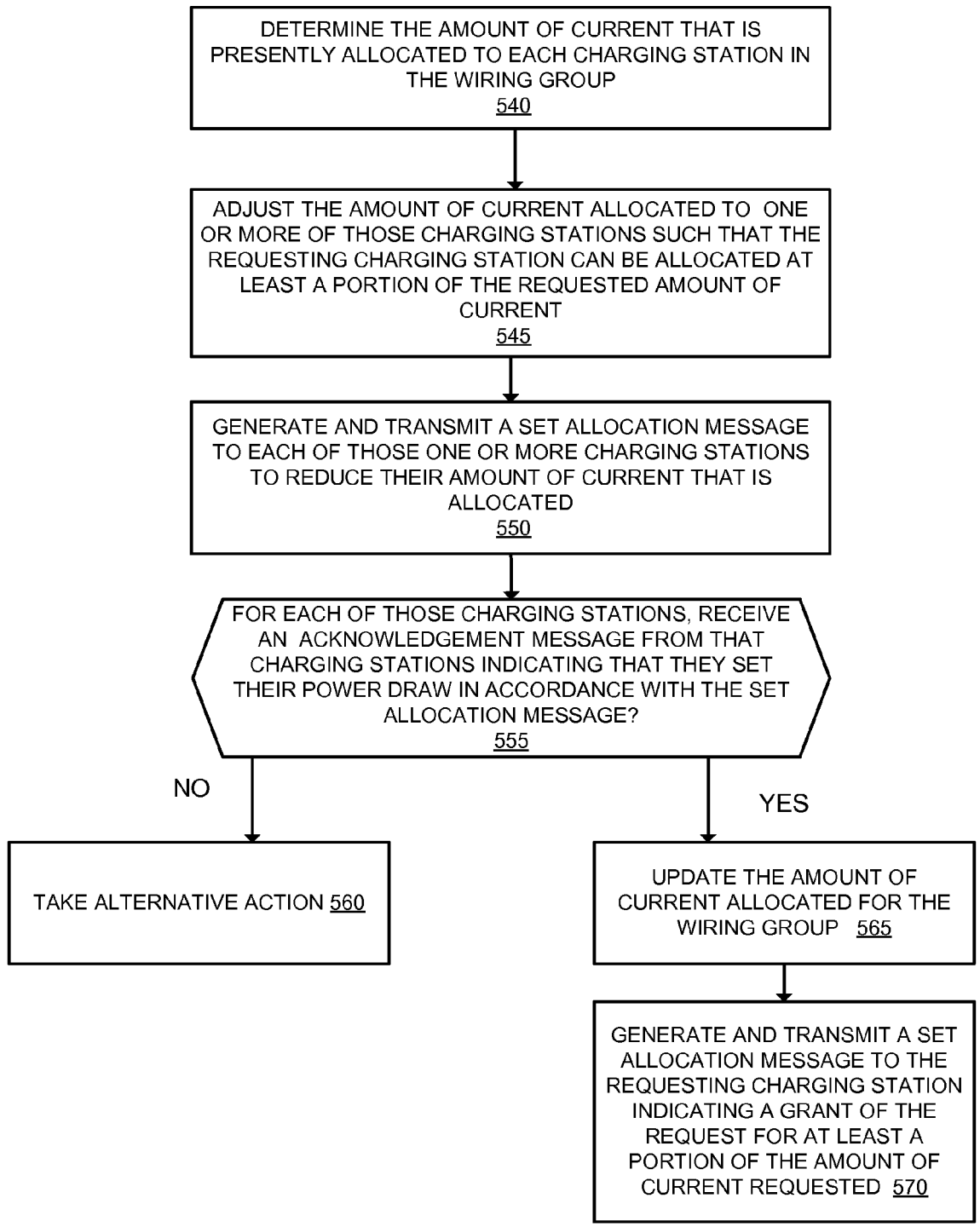

FIGS. 5A-B are flow diagrams illustrating exemplary operations for a circuit sharing process based on load sharing according to one embodiment of the invention. In one embodiment, the operations described in reference to FIGS. 5A-B are performed by the circuit sharing controller 305. FIGS. 5A-B will be described with reference to the exemplary embodiment of FIG. 3 and will be described with reference to the charging station 120 requesting an allocation of electric current.

At block 510, the circuit sharing controller 305 receives a request for an allocation of current from the charging station 120 in the wiring group 350. The request may indicate the amount of electric current requested. Flow moves from block 510 to block 515. At block 515, the circuit sharing controller 305 determines the attributes of the wiring group 350 including the maximum amount of current supported by the wiring group 350 (the maximum amount of current supported by the circuit breaker 125) and the amount of current that is presently allocated to the wiring group 350. It should be understood that the amount of current presently allocated to the wiring group 350 can be distributed among zero or more of the charging stations in the wiring group 350. That is, there may not be any current allocated to the wiring group 350 or the current may be allocated to one or more members of the wiring group 350. Flow moves from block 515 to block 520.

At block 520, the circuit sharing controller 305 determines whether granting the request for the requested amount of current would exceed the maximum amount of current supported by the wiring group 350. If the grant would exceed the maximum amount of current that the wiring group 350 supports, flow moves to block 540 (which will be discussed in more detail with reference to FIG. 5B), otherwise flow moves to block 525. At block 525 the circuit sharing controller 305 updates the amount of electric current presently allocated for the wiring group 350 by the requested amount. Flow moves from block 525 to block 530. At block 530, the circuit sharing controller 305 generates and transmits a set current allocation message to the charging station 120 that indicates a grant of the request for the full amount of the requested allocation of current. With reference to FIG. 4, the circuit sharing controller 305 transmits the set current allocation message to the charging station 120 at operation 4.3.

Sometime after receiving the set current allocation message, the charging station 120 sets its power draw according to the set current allocation message at operation 4.4. For example, with reference to FIG. 2, the charging station control modules 205 cause the electricity control device 210 to energize the charging point connection 155. If the set current allocation message includes an amount of current to allocate (e.g., an upper limit on the amount of current that the charging station 120 can consume from, or provide to, the power grid 130), the charging station control modules 205 cause the electricity control device 210 to set that particular amount of power draw. For example, the electricity control device 210 can include circuitry to variably control the amount of power draw (e.g. Pulse Width Modulation (PWM) circuitry). After setting the power draw, the charging station 120 transmits a set electric current acknowledgement message to the circuit sharing controller 305 at operation 4.5.

With reference to FIG. 5B, at block 540 the circuit sharing controller 305 determines the amount of electric current that is presently allocated to each of the charging stations in the wiring group 350. Flow moves from block 540 to block 545, where the circuit sharing controller 305 adjusts the amount of electric current that is allocated to one or more of those charging stations such that the requesting charging station can be allocated at least a portion of the requested amount of electric current. In one embodiment, the circuit sharing controller 305 adjusts the electric current allocations of each of the charging stations in the wiring group 350 such that a substantially equivalent amount of electric current is allocated to each of the active charging stations (as used herein, an active charging station is a charging station that is allocated more than a relatively small amount of electric current and currently has a charging session).

In other embodiments, the circuit sharing controller 305 adjusts the electric current allocations of one or more of the active charging stations based on a set of one or more charging session attributes that include information about each of the charging sessions on the active charging stations. In such an embodiment, the adjustment does not necessarily result in each of the active charging stations being allocated a substantially equivalent amount of electric current. The charging session attributes can include charging session duration, the type of account associated with the charging session (e.g., privilege of the account), percentage of charge complete, percentage of charge remaining, battery temperature of the electric vehicle, time remaining on the charging session, priority of the charging session, etc. By way of example and not limitation, the circuit sharing controller 305 can be configured to more greatly reduce the electric current allocation of a charging station that has a charging session that has been operating longer than another charging station that has a charging session on the same electrical circuit. As another example, the circuit sharing controller 305 adjusts the electric current allocations based on the privilege of the accounts associated with charging sessions on the charging stations (e.g., an account with a higher privilege can be allocated a relatively higher amount of electric current than an account with a lower privilege).

Flow moves from block 545 to block 550 where the circuit sharing controller 305 generates and transmits a set current allocation message to each of those one or more charging stations to instruct those charging stations to set the amount of electric current they are drawing to the amount the circuit sharing controller 305 has allocated. Thus, each set current allocation message indicates the amount of electric current that has been allocated to a charging station. Upon receipt of a set current allocation message, the charging station 120 sets its power draw (e.g., the maximum amount of electricity it can draw from the power grid 130).

The charging stations can set (e.g., reduce or increase) the amount of electric current they are drawing in different ways in different embodiments. In one embodiment, the electricity control device 210 in the charging station 120 includes circuitry and electronics to variably control the output of the charging station (e.g., using Pulse Width Modulation (PWM)). In another embodiment, the charging stations can control the amount of current drawn by an electric vehicle via a communication link between the charging stations and the electric vehicle (e.g., through a SAE 1772 interface). In such an embodiment, the electric vehicles accept a charging cord that connects control signals from the charging station that instructs the electric vehicle e how much current the charging station can supply (e.g., how much current at 220V).

Flow moves from block 550 to block 555. At block 555, the circuit sharing controller 305 determines for each of the charging stations that have been sent a set current allocation message, whether an acknowledgement message has been received from that charging station (the acknowledgement message indicating the power draw has been set in accordance with the set allocation message). If an acknowledgement message has not been received, flow moves to block 560 where alternative action is taken. For example, the alternative action can include retransmitting the set current allocation message a number of times. If an acknowledgement message is still not received after retransmitting the set current allocation message the number of times, the alternative action can include transitioning back to block 540 to begin the process of re-allocating the electric current with the assumption that the charging station(s) that have not replied are capable of drawing electric current at their full electric current allocation (their present electric current allocation) and cannot be adjusted). If acknowledgement messages have been received, then flow moves to block 565.

At block 565, the circuit sharing controller 305 updates the amount of current allocated for the wiring group and for each of the active charging stations in the wiring group (at least those charging stations that have adjusted their electric current allocation). Flow moves from block 565 to block 570, where the circuit sharing controller 305 generates and transmits a set allocation message to the requesting charging station which indicates an amount of electric current that has been allocated to that charging station. Upon receipt of a set current allocation message, the requesting charging station sets its power draw in accordance with the set current allocation message.

Figure 6:
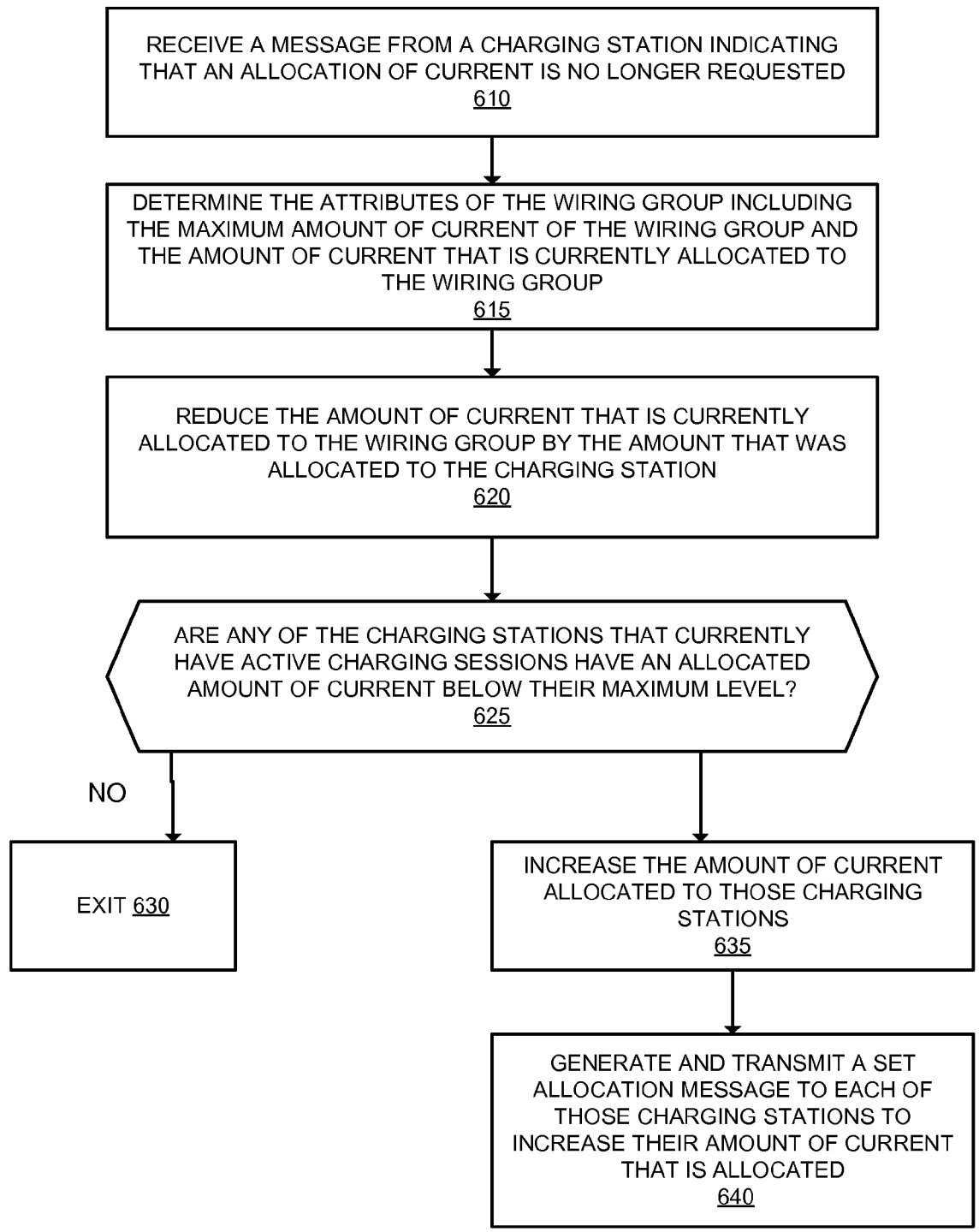
FIG. 6 is a flow diagram illustrating exemplary operations for dynamically adjusting electric current allocations of multiple charging stations on the same electrical circuit when a charging station no longer requests an allocation of current according to one embodiment of the invention.

FIG. 6 is a flow diagram illustrating exemplary operations for dynamically adjusting electric current allocations of multiple charging stations on the same electrical circuit when a charging station no longer requests an allocation of current according to one embodiment of the invention. FIG. 6 will be described with reference to the exemplary embodiment of FIG. 3. In one embodiment, the operations described in FIG. 6 are performed by the circuit sharing controller 305.

At block 610, the circuit sharing controller 305 receives a message from a charging station (e.g., the charging station 120) indicating that an allocation of current is no longer requested. For example, the message can be sent as a result of the charging session ending (e.g., the vehicle operator 110 ending the charging session), the charging session completed (or substantially completed), etc. Flow then moves to block 615 where the circuit sharing controller 305 determines the attributes of the wiring group of the charging station (the wiring group 350) including the maximum amount of current supported by the wiring group 350 (the maximum amount of current supported by the circuit breaker 125) and the amount of electric current that is presently allocated to the wiring group 350. Flow then moves to block 620.

At block 620, the circuit sharing controller 305 reduces the amount of current that is presently allocated to the wiring group by at least a portion of the amount that was allocated to the charging station (a relatively small amount of current may remain allocated to the charging station). Thus, the circuit sharing controller 305 returns at least a portion of the amount of current that was allocated to the charging station to the wiring group (that is, the at least a portion of the allocated amount can be allocated to different ones of the charging stations in the wiring group). Flow moves from block 620 to block 625.

At block 625, the circuit sharing controller 305 determines whether any of the charging stations that currently have active charging sessions have an allocated amount of current below their maximum level. If no, then flow moves to block 630 where the process exists. If there are one or more charging stations that currently have active charging sessions that are allocated an amount less then their maximum level, then flow moves to block 635.

At block 635, the circuit sharing controller 305 increases the amount of allocated current to one or more of those charging stations from the amount of current returned to the wiring group. In one embodiment the amount of allocated current is substantially equally distributed across the one or more charging stations. In another embodiment, the amount of current returned to the wiring group is allocated to those charging stations based on a set of one or more charging session attributes (e.g., charging session duration, type of account associated with the charging session (e.g., privilege of the account), percentage of charge complete, battery temperature of the electric vehicle, percentage of charge remaining, time remaining on the charging session, priority of the charging session, etc.). Flow moves from block 635 to block 640. At block 640, the circuit sharing controller 305 generates and transmits a set allocation message to each of those charging stations to increase their amount of electric current allocation.

In the event of the circuit sharing controller 305 losing connectivity with member(s) of the wiring group 350, those charging stations in the wiring group 350 maintain their present allocations. For example, a charging station with an electric current allocation of 15 A will maintain that allocation upon losing connectivity with the circuit sharing controller 305 until connectivity is re-established regardless of whether that charging station is active or idle. In some embodiments, a relatively small amount of electric current is allocated to each of the charging stations in the wiring group 350 so that each of the charging stations can at least minimally supply current to electric vehicles in case of a failure of the circuit sharing controller 305 or a loss of network connectivity with the circuit sharing controller 305.

While FIGS. 5A-B and 6 describe an circuit sharing process based on the charging stations sharing the load of the electrical circuit when the circuit would otherwise be overloaded, in some embodiments the circuit sharing mechanism is based on a time sharing process. For example, a time sharing process can be used when charging stations do not have the capability of throttling their power draw (e.g., the electricity control device either energizes or de-energizes the charging point connection and thus the charging point connection can either draw either all of the power draw it is rated for or no power draw). For example, with reference to FIG. 2, the electricity control device 210 energizes and de-energizes the charging point connection 155 but does not include (or does not implement) an electric current throttling mechanism.

In some embodiments, a time sharing process is used to control the duty cycle of the charging station output such that each of the charging stations in a wiring group can take turns drawing power from the power grid while not exceeded the maximum capacity of the electrical circuit based on a time sharing process. In the time sharing process described herein, a charging station is typically in one of the following three states: idle, electric current allocated, and waiting for electric current allocation. In the idle state, an electric vehicle is not coupled with the charging station and a charging session is not active (thus the charging station is not being used). In the electric current allocated state, the charging station is presently allocated electric current and a charging session is active. Electric current can be drawn from the power grid in the electric current allocated state. In the waiting for electric current allocation state, a charging session is active; however electric current is not presently allocated and the charging station is not authorized to draw current from the power grid.

Figure 7:
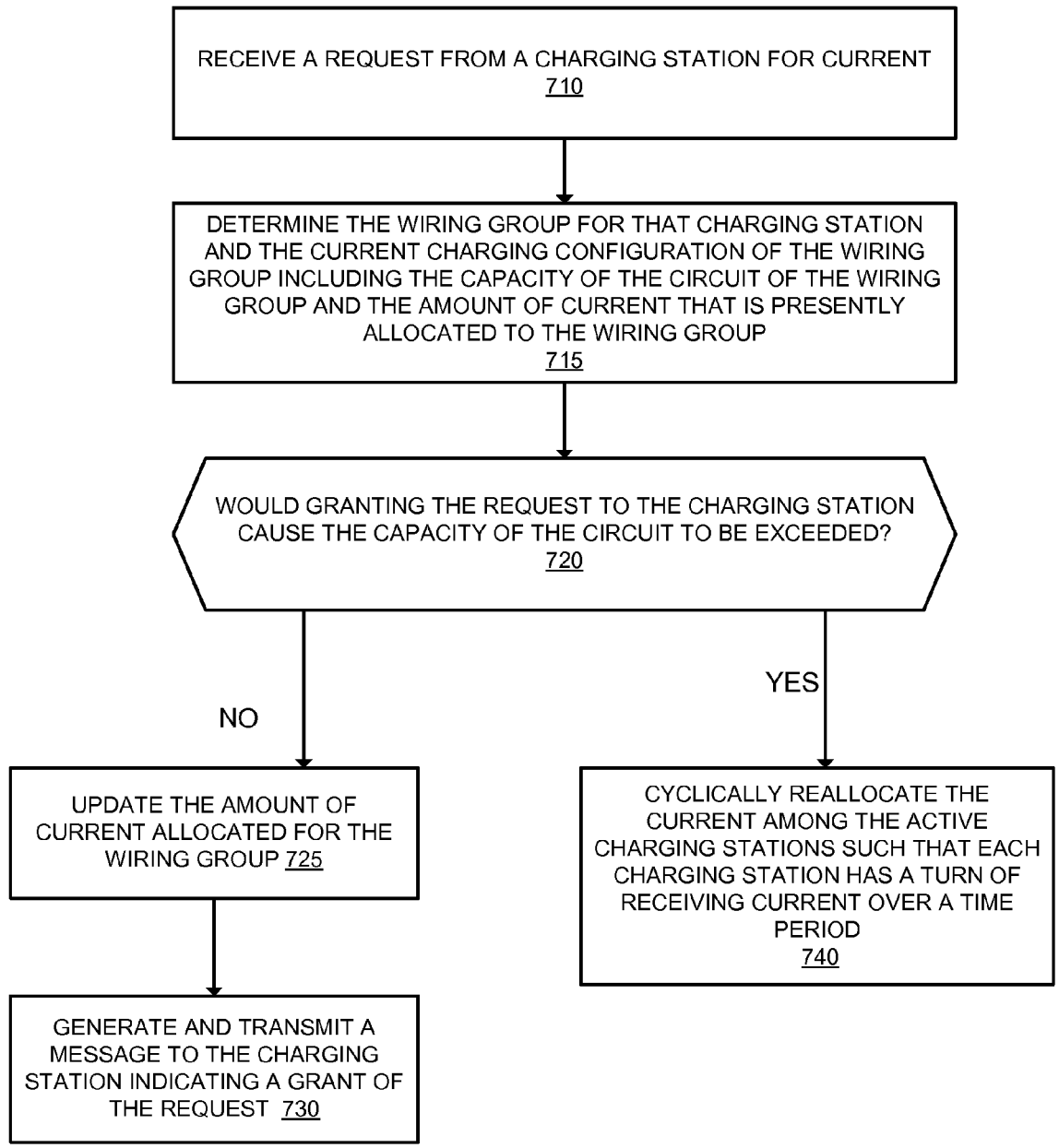
FIG. 7 is a flow diagram illustrating exemplary operations for performing a circuit sharing process that is based on time sharing according to one embodiment of the invention.

FIG. 7 is a flow diagram illustrating exemplary operations for performing a circuit sharing process that is based on time sharing according to one embodiment of the invention. FIG. 7 will be described with reference to the exemplary embodiment of FIG. 3. In one embodiment, the operations described in FIG. 7 are performed by the circuit sharing controller 305.

At block 710, the circuit sharing controller 305 receives a request from a charging station for an allocation of current. For purposes of explanation, FIG. 7 will be described with reference to the circuit sharing controller 305 receiving the request from the charging station 120. Flow then moves to block 715, where the circuit sharing controller 305 determines the wiring group of the charging station 120 if necessary (if the circuit sharing controller 305 is providing service for a single wiring group then that wiring group is assumed) and the current charging configuration of the wiring group including the capacity of the circuit of the wiring group (e.g., the maximum amount of current supported by the wiring group) and the amount of current that is presently allocated to the wiring group (to members of the wiring group). As part of the charging configuration, the circuit sharing controller 305 also determines the amount of current the charging station 120 supplies (different charging stations in the wiring group 350 can supply a different amount of current in some embodiments). Flow moves from block 715 to block 720.

At block 720, the circuit sharing controller 305 determines whether granting the request (e.g., allowing the charging station 120 to energize the charging point connection 155 and supply the maximum amount of current to the electric vehicle 110) would cause the capacity of the electrical circuit to be exceeded. If the capacity would be exceeded, then flow moves to block 740, otherwise flow moves to block 725.

At block 725, the circuit sharing controller 305 updates the amount of current that is allocated for the wiring group. Flow moves from block 725 to block 730 where the circuit sharing controller 305 generates and transmits a message to the charging station 120 indicating a grant of the request. Upon receipt of the message, the charging station 120 energizes the charging point connection 155 to allow electricity to flow between the power grid 130 and the electric vehicle 110.

At block 740 (the capacity of the circuit would be exceeded), the circuit sharing controller 305 cyclically reallocates the current among the charging stations in the wiring group such that each charging station has a turn of receiving current over a time period (at least those charging stations that have an active charging session). That is, the circuit sharing controller 305 cycles through the charging stations in the wiring group such that each of those charging stations can supply current for a certain amount of time in a given time period.

Figure 8:
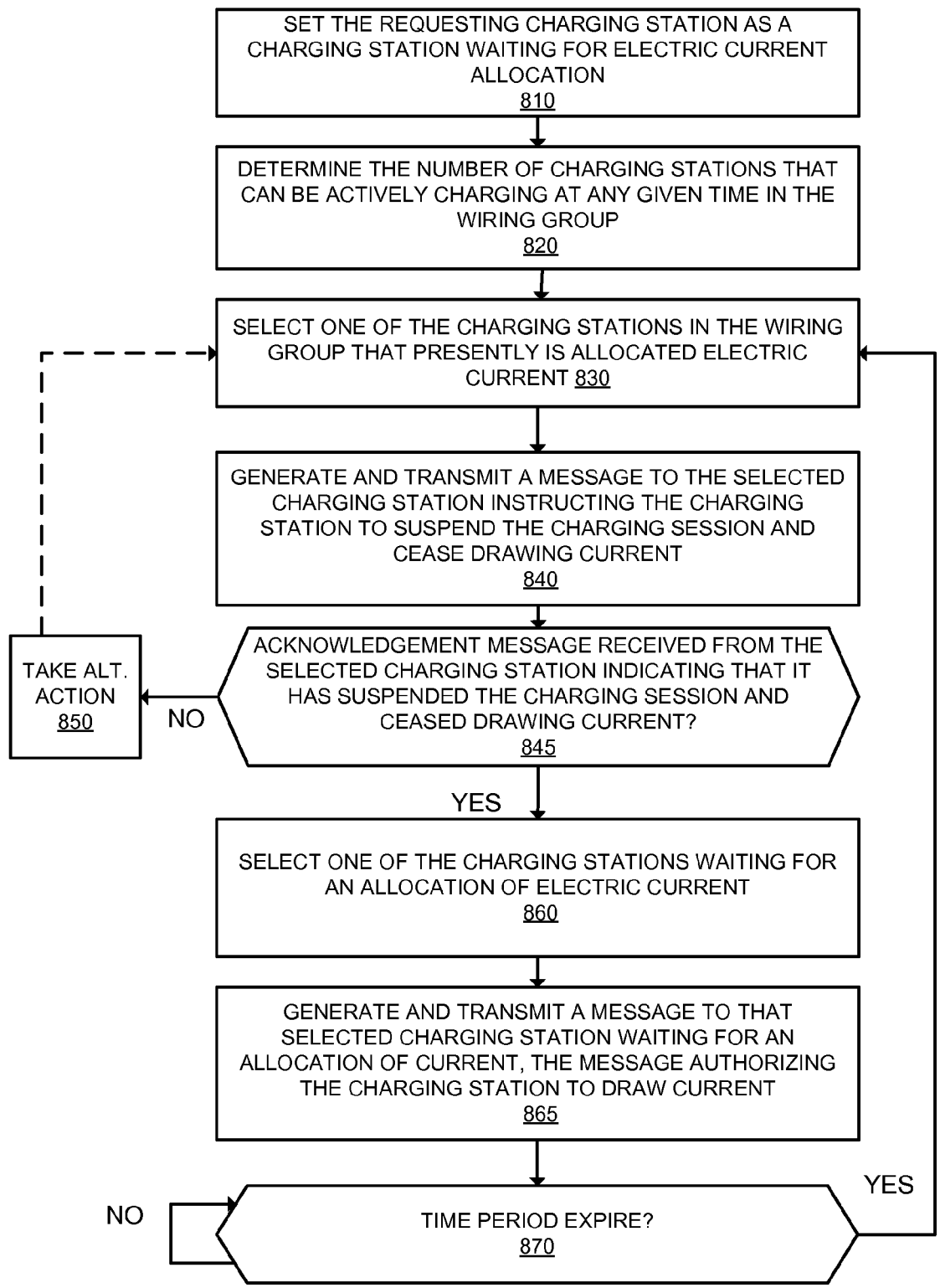
FIG. 8 is a flow diagram illustrating exemplary operations for cyclically reallocating electric current in a time sharing process according to one embodiment of the invention.

The cyclical reallocation of electric current can be performed differently in different embodiments of the invention. FIG. 8 is a flow diagram illustrating exemplary operations for cyclically reallocating electric current according to one embodiment of the invention. In one embodiment, the operations described in FIG. 8 are part of the operation of block 740.

At block 810, the circuit sharing controller 305 sets the requesting charging station as a charging station that is presently waiting for electric current allocation. Other charging station(s) in the wiring group 350 may also be presently waiting for electric current allocation. Flow then moves to block 820, where the circuit sharing controller 305 determines the number of charging stations that can be actively charging in the wiring group 350 at a given time. By way of example and not limitation, if each charging station of the wiring group 350 supplies 15 A of current, and the circuit has a capacity of 50 A, then three charging stations can be actively charging at any given time without overloading the capacity of the circuit. In some embodiments, the operation described in block 820 is optional. Flow moves from block 820 to block 830.

At block 830, the circuit sharing controller 305 selects one of the charging station(s) that presently is allocated current (thus is in the electric current allocated state). The circuit sharing controller 305 can select that charging station in different ways in different embodiments (e.g., a random selection, a sequential selection, a selection based on one or more charging session attributes (e.g., charging session duration, type of account associated with the charging session (e.g., privilege of the account), percentage of charge complete, percentage of charge remaining, battery temperature of the electric vehicle, time remaining on the charging session, priority of the charging session, etc.), etc.). Flow moves from block 830 to block 840.

At block 840, the circuit sharing controller 305 generates and transmits a message to that selected charging station in the electric current allocated state. The message instructs that charging station to suspend the charging session and cease drawing current from the power grid 130. Thus, the message is an attempt by the circuit sharing controller 305 to transition the selected charging station from the electric current allocated state to the waiting for electric current allocation state.

Flow moves from block 840 to block 845 where the circuit sharing controller 305 waits to receive an acknowledgement message from that charging station that indicates that it has suspended the charging session and ceased drawing current from the power grid 130. If the circuit sharing controller 305 receives such an acknowledgement message, then flow moves to 860, otherwise flow moves to block 850.

At block 850 (an acknowledgement message has not been received), the circuit sharing controller 305 takes alternative action. The alternative action can include retransmitting the message to the selected charging station a number of times. If the circuit sharing controller 305 still does not receive an acknowledgement message, the circuit sharing controller 305 assumes that the selected charging station is actively charging (or is capable of drawing its maximum amount of current from the power grid 130) and flow moves back to block 830 where the circuit sharing controller 305 selects a different charging station that is in the electric current allocated state.

At block 860, the circuit sharing controller 305 selects one of the charging station(s) that are waiting for electric current allocation. The circuit sharing controller 305 can select the charging station in different was in different embodiments. For example, the charging station that has been waiting the longest for an allocation of current can be selected. As another example, the selected charging station can be based one or more charging session attributes (e.g., charging session duration, the type of account associated with the charging session (e.g., privilege of the account), percentage of charge complete, percentage of charge remaining, battery temperatures of the electric vehicles, time remaining on the charging session, priority of the charging session, etc.). Flow moves from block 860 to block 865.

At block 865, the circuit sharing controller 305 generates and transmits a message to the selected charging station that authorizes that charging station to draw current from the power grid 130. The circuit sharing controller 305 also sets that selected charging station as being in the electric current allocated state. Upon receipt of the message, the charging station can resume (or initiate) its charging session and energize its charging point connection and draw current from the power grid 130. Flow moves from block 865 to block 870, where the circuit sharing controller 305 waits for a time period to expire. If the time period has expired, then flow moves back to block 830.

Thus, multiple charging stations can share the same electrical circuit without overloading the capacity of that circuit by using the time sharing process described above. In some embodiments the charging stations are treated equally (e.g., a round-robin approach) while in other embodiments the charging stations can be treated differently based on one or more charging session attributes (e.g., charging session duration, the type of account associated with the charging session (e.g., privilege of the account), percentage of charge complete, percentage of charge remaining, battery temperature of the electric vehicle, time remaining on the charging session, priority of the charging session, etc.).

Figure 9:
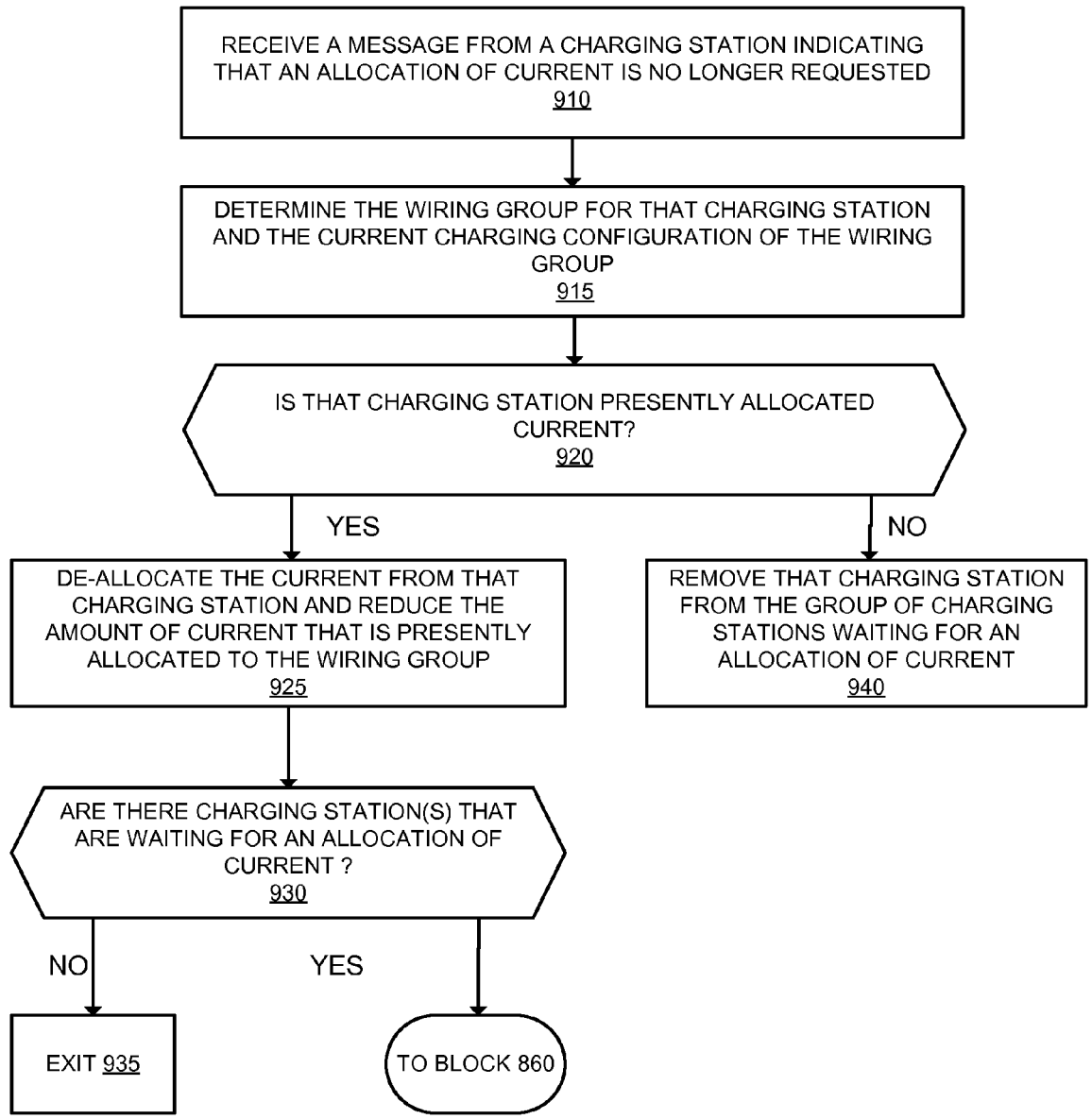
FIG. 9 is a flow diagram illustrating exemplary operations performed in a circuit sharing process that is based on time sharing when a charging station no longer requests an allocation of current according to one embodiment of the invention.

FIG. 9 is a flow diagram illustrating exemplary operations performed in a circuit sharing process that is based on time sharing when a charging station no longer requests an allocation of current according to one embodiment of the invention. FIG. 9 will be described with reference to the exemplary embodiment of FIG. 3. In one embodiment, the operations described with reference to FIG. 9 are performed by the circuit sharing controller 305.

At block 910, the circuit sharing controller 305 receives a message from a charging station that indicates that an allocation of current is no longer requested. For purposes of explanation, FIG. 9 will be described with reference to the circuit sharing controller 305 receiving the message from the charging station 120. The message can indicate that the charging session has ended (e.g., the vehicle operator 145 has ended the charging session) or that charging has been completed or substantially completed (e.g., the charging station 120 has measured a relatively small amount of current transferred to the electric vehicle over a continuous amount time, etc.). Flow moves from block 910 to block 915.

At block 915, the circuit sharing controller 305 determines the wiring group for the charging station 120 if appropriate (if the circuit sharing controller 305 is providing service for multiple wiring groups) and the current charging configuration of the wiring group (e.g., which (if any) of the charging stations of the wiring group 350 presently have an allocation of current, which (if any) of the charging stations of the wiring group 350 are presently waiting for an allocation of current, which (if any) of the charging stations of the wiring group 350 are idle, the capacity of the electrical circuit, etc.). Flow moves from block 915 to block 920.

At block 920, the circuit sharing controller 305 determines whether the charging station 120 presently is allocated current. If the charging station 120 is presently allocated current, then flow moves to block 925, otherwise flow moves to block 940 where the charging station 120 is removed from the group of charging station(s) that are currently waiting for an allocation of current. At block 925, the circuit sharing controller 305 de-allocates the current from the charging station 120 and reduces the amount of current that is presently allocated to the wiring group 350 (e.g., returns that amount of current). Flow then moves to block 930 where the circuit sharing controller 305 determines whether there are other charging station(s) that are waiting for an allocation of current in the wiring group 350. If there are none, then flow moves to block 935 where the process exits, otherwise flow moves back to block 860 of FIG. 8 and the current that was allocated to the charging station 120 can be allocated to one of the other charging station(s) that are waiting for an allocation of current.

In the event of the circuit sharing controller 305 losing connectivity with one or more charging stations of the wiring group 350, each of those charging stations maintain their present state. For example, charging stations in the electric current allocated state remain in that state with that amount of electric current being allocated and those charging stations that are in the waiting for electric current allocation state remain waiting for electric current allocation until connectivity is restored with the circuit sharing controller 305.

Figure 10:
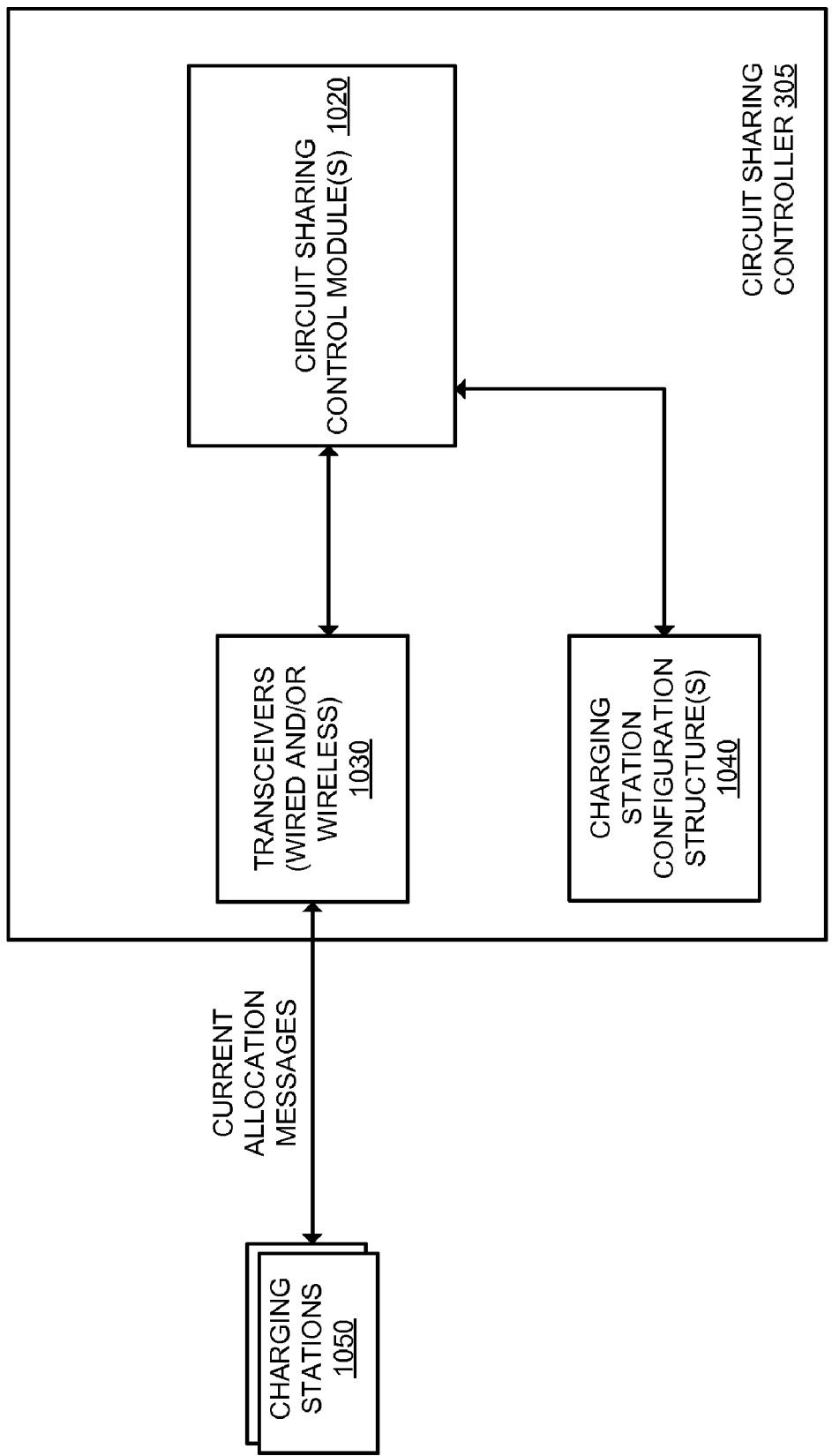
FIG. 10 illustrates an exemplary embodiment of a circuit sharing controller according to one embodiment of the invention.

FIG. 10 illustrates an exemplary embodiment of the circuit sharing controller 305 according to one embodiment of the invention. As illustrated in FIG. 10, the circuit sharing controller 305 includes the transceivers (wired and/or wireless) 1030 coupled with one or more circuit sharing control modules 1020. The one or more circuit sharing control modules 1020 are coupled with the one or more charging station configuration structure(s) 1040. The circuit sharing control module(s) 1020 perform the circuit sharing mechanism described herein (e.g., load sharing and/or time sharing for different wiring groups). Current allocation messages are exchanged between the charging stations 1050 and the transceiver(s) 1030 (e.g., current allocation request messages, current allocation set messages, acknowledgement messages, etc.). The charging station configuration structure(s) 1040 stores charging station configuration information (e.g., for each charging station, the wiring group for that charging station, the capacity of the electrical circuit of that wiring group, a trip margin, a quantity of electric current allocated for members of that wiring group, whether a vehicle is plugged into the charging station, the duration of charging session (current and past), etc.).

Embodiments of the invention described herein can reduce the cost of the power distribution infrastructure needed to deploy charging stations. For example, the number of service drops and meters, the amount of heavy gauge wiring, etc., can be reduced. Additionally, the need for power utilities to add or replace local transformers to support the load of the charging stations is also reduced.

In some embodiments of the invention, the electric current allocation request messages also include information for authorizing the vehicle operator associated with the charging session. If the vehicle operator is not authorized, that charging station will not be allocated electric current.

While embodiments of the invention have described a centrally located device controlling the electric current allocations for a wiring (e.g., the circuit sharing controller 305 controlling the electric current allocations for the wiring group 350), in other embodiments the circuit sharing mechanism is distributed among the charging stations in a wiring group (e.g., distributed amount the charging stations 120, 310, 315, 325, and 330 of the wiring group 350).

While the flow diagrams in the figures show a particular order of operations performed by certain embodiments of the invention, it should be understood that such order is exemplary (e.g., alternative embodiments may perform the operations in a different order, combine certain operations, overlap certain operations, etc.)

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method for a shared electrical circuit infrastructure for charging electric vehicles, comprising:

determining a maximum amount of electric current supported by an electrical circuit that is shared among a plurality of electric vehicle charging stations, wherein the maximum amount of electric current supported by the electrical circuit supports less than a complete utilization of the electric vehicle charging stations; and dynamically allocating electric current to at least two of the electric vehicle charging stations based on at least an amount of electric current presently allocated on the electrical circuit such that the maximum amount of electric current supported by the electrical circuit is prevented from being exceeded while permitting each of the electric vehicle charging stations to draw electric current through the electrical circuit for at least some amount of time.

2. The method of claim 1, further comprising:

determining an amount of electric current presently allocated to each of the electric vehicle charging stations; and wherein the dynamically allocated is further based on the amount of electric current presently allocated to each of the electric vehicle charging stations.

3. The method of claim 1, wherein the dynamically allocating electric current includes dynamically adjusting electric current allocations including increasing electric current allocations of some of the electric vehicle charging stations or decreasing electric current allocations of some of the electric vehicle charging stations.

4. The method of claim 1, wherein the dynamically allocating electric current is further based on a set of one or more charging session attributes associated with charging sessions on the electric vehicle charging stations, the set of charging session attributes including for each charging session one or more of charging session duration, type of account associated with that charging session, percentage of charging complete, percentage of charging remaining, battery temperature of the electric vehicle, priority of that charging session, and time remaining on that charging session.

5. The method of claim 1, further comprising a circuit sharing controller that is coupled with each of the electric vehicle charging stations transmitting messages to those electric vehicle charging stations that instruct those electric vehicle charging stations to set a certain amount of electric current they draw on the electrical circuit.

6. The method of claim 5, wherein the dynamically allocating electric current further includes the circuit sharing controller receiving acknowledgement messages from those electric vehicle charging stations that indicate that those electric vehicle charging stations have set their amount of electric current they draw on the electrical circuit in accordance with the transmitted messages.

7. The method of claim 1, wherein the dynamically allocating electric current further includes the circuit sharing controller transmitting messages to those electric vehicle charging stations that instruct those electric vehicle charging stations to cease or commence the flow of electric current on the electrical circuit.

8. The method of claim 7, wherein the dynamically allocating electric current further includes the circuit sharing controller receiving acknowledgement messages from those electric vehicle charging stations that indicate they have received the transmitted messages and acted in accordance with the transmitted messages.

* * * * *